April 12, 1960
H. E. STEARNS
2,932,484
SIDE OUTLETS FOR ABOVE-GROUND IRRIGATION PIPES
Filed April 15, 1957
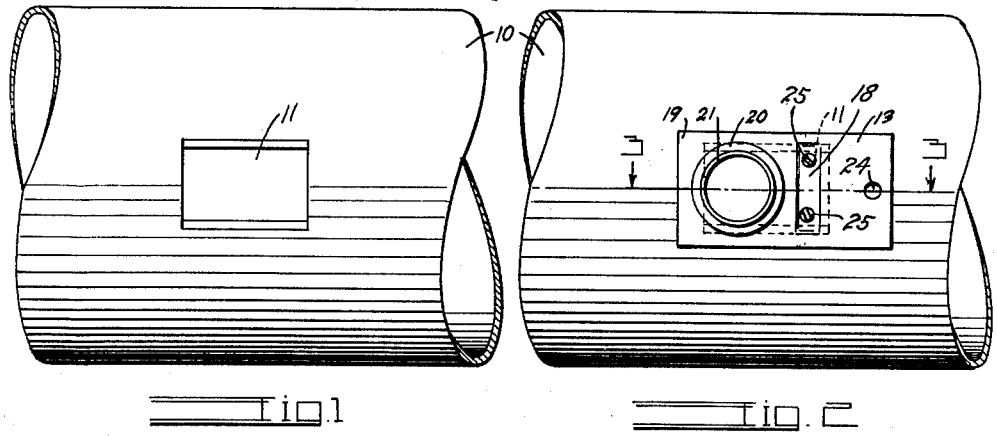
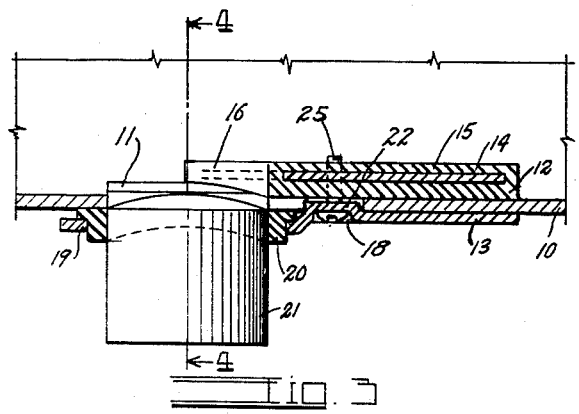
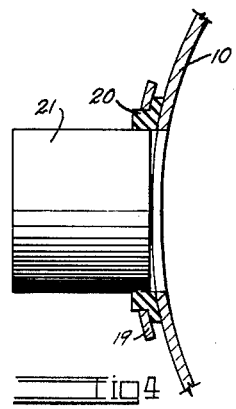
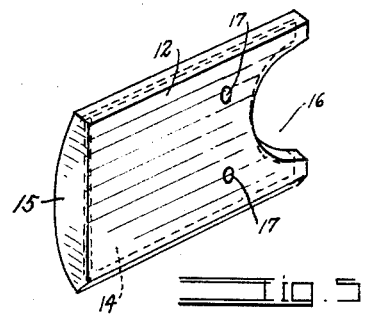
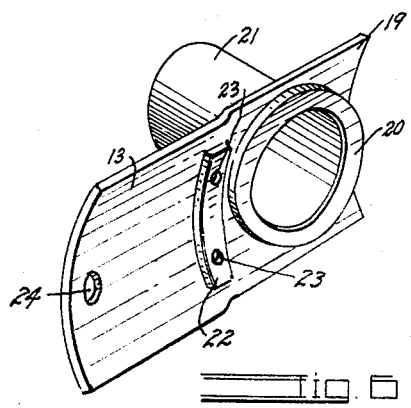
INVENTOR.
HOWARD E. STEARNS
BY
*ATTORNEY*

2,932,484

SIDE OUTLETS FOR ABOVE-GROUND IRRIGATION PIPES

Howard E. Stearns, Grand Island, Nebr.

Application April 15, 1957, Serial No. 652,976

4 Claims. (Cl. 251—145)

This invention relates to a side outlet valve for above-ground irrigation pipes. The method of present day irrigation is to lay thin-walled pipe, preferably of aluminum, upon the ground surface. Outlets are cut in the wall of the pipe at desired points to allow the water to discharge into lateral field ditches for irrigation purposes.

The principal object of this invention is to provide a highly efficient valve which can be quickly and easily installed in the wall of an irrigation pipe by simply cutting a rectangular opening in the wall and assembling the improved valve through the opening without necessity for disturbing the lay of the pipe or the flow therein.

Another object of the invention is to provide an easily installed side outlet valve which can be quickly and easily preset and locked to deliver any desired flow of water through the outlet or which when desired can be completely closed to prevent flow through the outlet.

A further object is to provide a controllable, easily insertable, irrigation valve to which a flexible tube may be applied for delivering water to any desired point.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of a section of conventional thin-walled irrigation pipe, illustrating the type of opening formed therein for the installation of the improved side outlet valve;

Fig. 2 illustrates the valve in place in the opening of Fig. 1 and in the fully opened position;

Fig. 3 is an enlarged longitudinal section, taken on the line 3—3, Fig. 2;

Fig. 4 is a fragmentary, enlarged, cross-section, taken on the line 4—4, Fig. 3;

Fig. 5 is a perspective view looking toward the inside face of an inner valve member employed in the improved valve; and Fig. 6 is a similar perspective view looking toward the inside face of an outer valve member employed therein.

Portions of a conventional above-ground irrigation pipe are indicated at 10. To install the improved valve in the pipe 10, a longitudinally-elongated, rectangular opening 11 is cut in the pipe 10 to receive the improved side outlet valve. The valve comprises an elongated inner valve member 12 and an elongated outer valve member 13. Both valve members are transversely arcuate to correspond to the circumferential curvature of the pipe 10.

The inner valve member comprises an elongated, flat, metallic plate 14 completely surrounded by and embedded in a rubber casing 15 having a relatively flat inner face and an arcuate outer face conforming to the inner curvature of the pipe 10. One extremity of the inner valve member 12 is formed with a medially-positioned, semi-circular terminal notch 16 adjacent which two screw passage holes 17 are formed. The holes 17 pass through the embedded plate and are tapped therein to receive two clamp screws 25.

The outer valve member 13 is formed with an outwardly offset arcuately curved extension portion 19 provided with a circular water discharge opening completely surrounded by an annular flexible gasket 20. The gasket 20 is L-shaped in cross-section so as to provide an inner flange which lies against the inner face of the portion 19 and an outer flange which extends through the water opening in the portion 19. The thickness of the inner flanges and the amount of offset between the outer valve member 13 and the extension portion 19 are such as to substantially align the inner surface of the inner flange of the gasket 20 with the inner surface of the outer valve member 13. A cylindrical discharge nipple 21 is forced into the gasket 20 and is frictionally retained therein so as to project rigidly outward from the extension portion 19 of the outer valve member 13.

The outer valve member 13 is indented, as shown at 18, to form an elongated, transversely-extending, inwardly-projecting, guide lug 22 on the inner surface of the member 13 adjacent the gasket 20. The lug 22 is provided with two spaced-apart screw passage holes 23 for the passage of the clamp screws 25. The length of the lug 22 is such as to allow it to fit snugly into the opening 11 in the pipe 10 to prevent circumferential movement of the outer valve member 13 thereon and to guide the member 13 smoothly along the length of the opening. The spacing of the screw passage holes 23 corresponds to the spacing of the holes 17 in the inner valve member 12. The length of the opening 11 in the pipe 10 exceeds the width of the inner valve member 12 and the width and length of both valve members 12 and 13 exceeds the width and length of the hole 11 in the pipe.

In installing the improved valve in the pipe 10, the nipple 21 is preferably removed from the outer valve member. The inner valve member 12 is then turned on its side and passed endwise through the opening 11, and the concave side thereof is turned toward the opening. The inner valve member is then held against the inner surface of the pipe and the index finger of the right hand is inserted through the gasket 20 and into the opening in the pipe to retain the inner valve member in place while the outer valve member is slipped into place in the opening and the clamp screws 25 are inserted and threaded into the plate 14 of the inner member. The two screws 25 are now tightened to draw the two valve members toward each other to bring the gasket 20 into sealing contact with the pipe surface and to retain the lug 22 within the pipe opening. The nipple 21 is then reinserted in its retaining gasket 20. It can be seen that by loosening the screws 25 the entire assembly can be slid longitudinally in one direction to cause the nipple 21 to align with the opening 11 to permit flow therethrough or in the opposite direction to cause the nipple 21 to pass completely beyond the opening with the inner valve member completely sealing the opening.

A flexible plastic tube can be slipped over the nipple 21 to carry and direct the water to any desired point. It will be noted that the heads of the screws 25 are positioned in the indentation 18 so as to be protected from damage during packing and shipping the improved side outlet. The outer valve member 13 is provided with a convenience opening 24 into which the extremity of any desired tool may be inserted to facilitate the longitudinal movement of the valve for water control purposes. The valve can be fixedly locked in any preset position by securely tightening the screws 25.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A side outlet valve for an above-ground irrigation pipe comprising: an inner valve member adapted to be inserted through a longitudinally elongated opening in the wall of said pipe and having a convex surface adapted to lie against the concave inner wall of said pipe about said opening to close the latter; an outer valve member having a concave surface adapted to lie against the convex outer surface of said pipe; a guide lug on the inner surface of said outer valve member adapted to seat in said opening; connecting means connecting the inner valve member to the outer valve member through said guide lug and said opening so that said valve members may be simultaneously moved longitudinally of said opening to withdraw said inner valve member from said opening; and an extension portion formed on said outer valve member positioned to cover a portion of said opening when the inner valve member has been partially withdrawn therefrom, the remainder of said opening remaining covered by said outer valve member, said extension portion having a water discharge hole formed therein.

2. A side outlet valve as described in claim 1 having a resilient gasket carried in said discharge hole in slidable contact with said pipe; and a discharge nipple seated in said gasket for conveying water from said hole.

3. A side outlet valve as described in claim 2 in which the connecting means acts to draw said extension portion toward said pipe so as to clamp said gasket between the extension portion and the pipe to provide a seal therebetween.

4. A side outlet valve as described in claim 1 in which the inner valve member comprises an elongated metal sheet and a cover of rubber surrounding said sheet.

References Cited in the file of this patent

UNITED STATES PATENTS

| 2,647,539 | Stearns | Aug. 4, 1953 |
| 2,684,827 | Hohnstein | July 27, 1954 |
| 2,734,713 | Webster | Feb. 14, 1956 |

FOREIGN PATENTS

| 524,162 | Belgium | Nov. 30, 1953 |